United States Patent Office 2,925,720
Patented Feb. 23, 1960

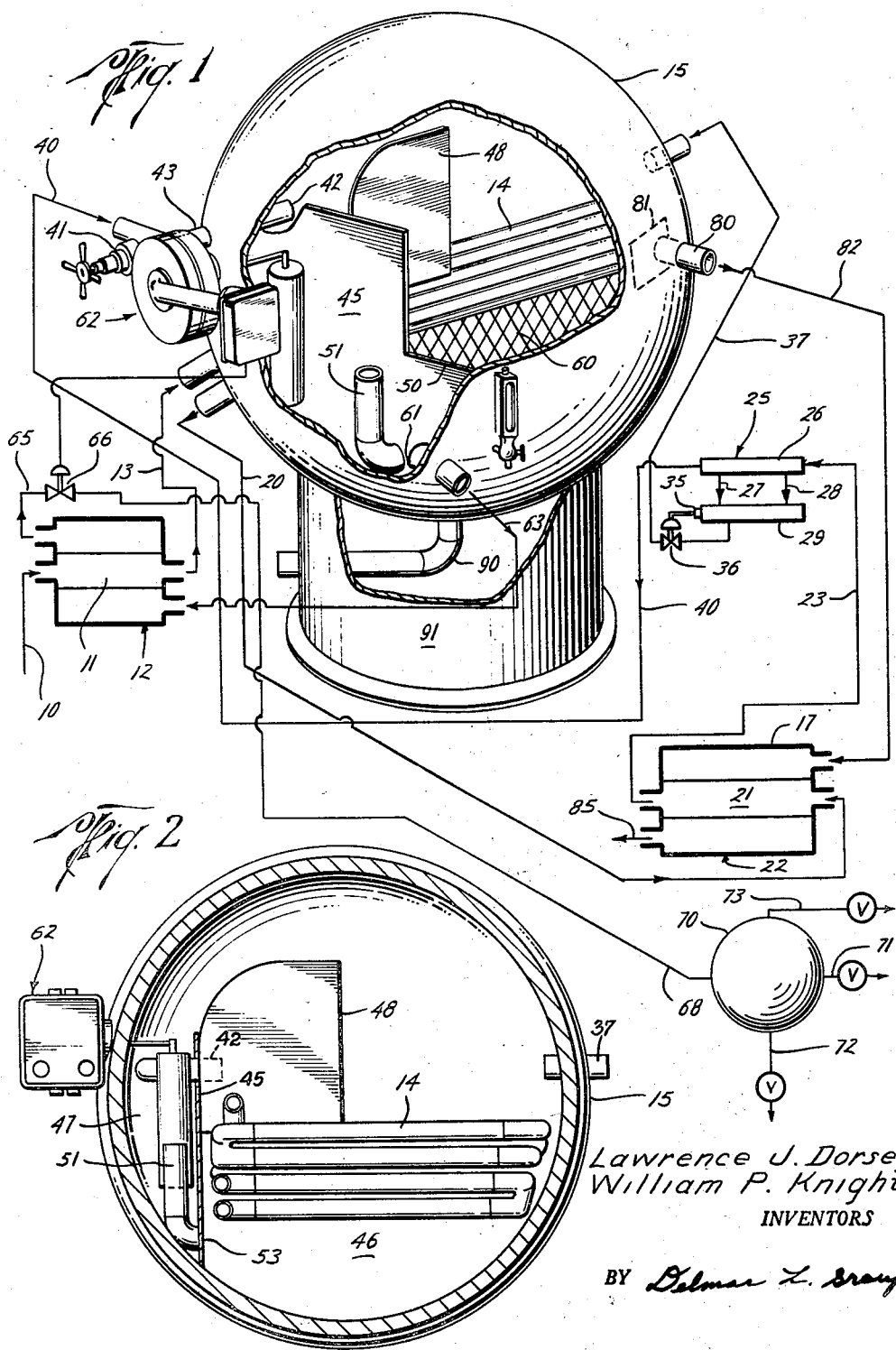

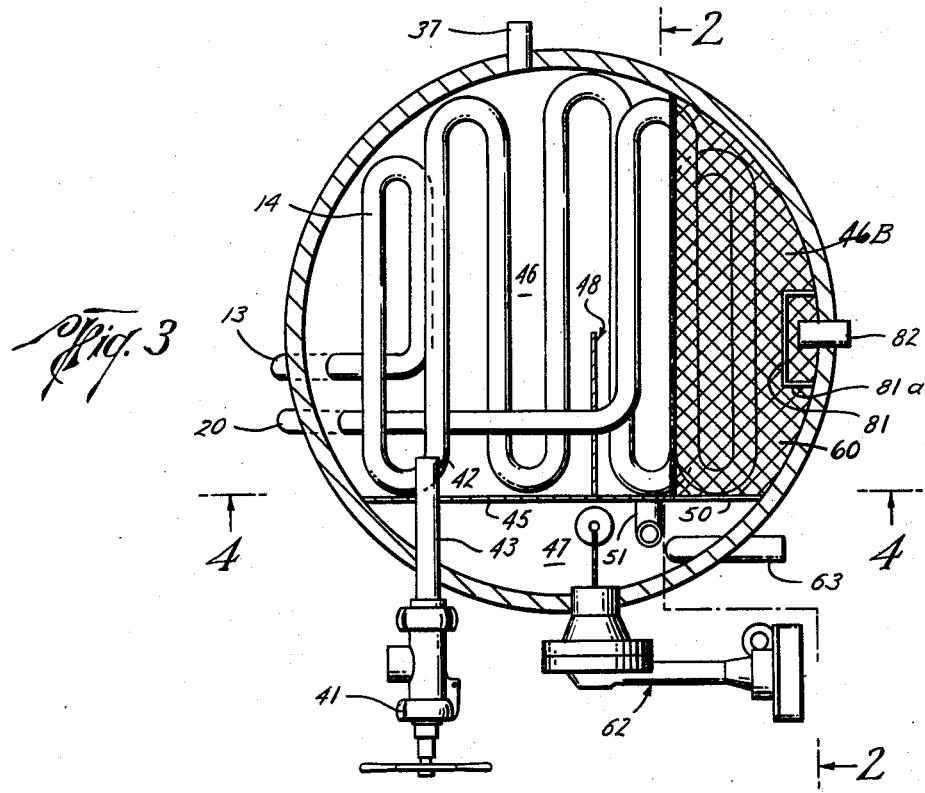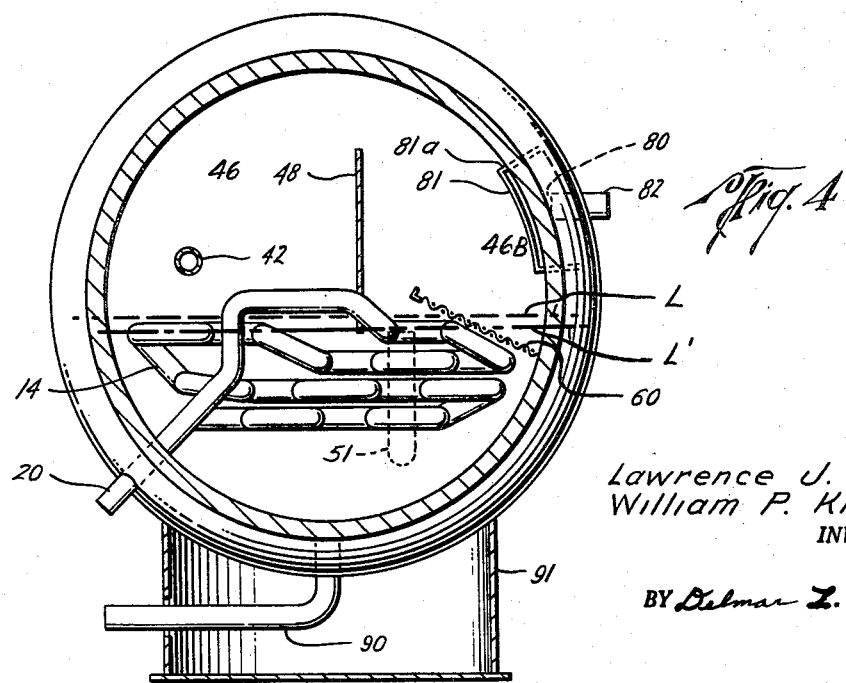
Lawrence J. Dorsey
William P. Knight
INVENTORS

2,925,720
APPARATUS FOR LOW TEMPERATURE SEPARATION OF HIGH PRESSURE GAS STREAMS

Lawrence J. Dorsey, Bellaire, and William P. Knight, Bay City, Tex., assignors, by mesne assignments, to Maloney-Crawford Tank and Manufacturing Company, Tulsa, Okla., a corporation of Delaware Application October 18, 1956, Serial No. 616,675

7 Claims. (Cl. 62—42)

This invention relates to the low temperature separation of distillate and water from high pressure well streams and more particularly to an improved method and means for the control of hydrate formation during such separation.

The well fluid from so-called "distillate" wells originates as a substantially homogenous gas phase in subsurface producing formations which are under high pressure and temperature. As the gas flows upwardly toward the surface of the earth, some condensation of hydrocarbon constituents and free water may occur as a result of a decrease of pressure and temperature. Furthermore, if the temperature of the wet gas is lowered sufficiently, the hydrocarbons combine with the water to form hydrate crystals which gather at valves, angles or irregularities in the line where they restrict the flow of gas. If unchecked, the accumulation of such crystals will plug the line.

In order to control the flow problems created by liquid condensation and the formation of ice or hydrates in lines from distillate producing gas wells, and in order to recover the valuable distillate content from the well fluid, it has become customary to provide low temperature separating units to separate the well fluid into gas, distillate and water as separate components. Generally these separating devices expand the gas stream to decrease the pressure and temperature of the well fluid within the separator unit to cause condensation of distillate and water. In order to remove a high percentage of distillate and water from the gas stream, the resulting low temperature within the unit will usually be kept very low so that conditions are favorable for the formation of hydrates or ice particles.

In these separator units a cold zone is provided in which the gas phase is separated from the hydrates and distillate. The separated hydrates and the distillate or hydrocarbon condensate drop out of the gas into a heated zone which is provided for the decomposition of hydrates and melting of any ice which may be formed. In order to facilitate separation of the liquid and solid components from the gas stream, devices prior to our invention have generally effected separation by either causing the gas to travel over a long horizontal path in a zone of relatively large cross sectional area or vertically through such a zone whereby solid and liquid particles are permitted to precipitate out of the gas stream. The devices presently used for this service generally are not efficient in utilizing the heating surfaces provided within the heated zone for heating of liquid because of practical difficulties in designing heat exchange means for liquid retained in such vessels. It is the usual practice to use a cylindrical vessel; however, such a vessel, whether disposed vertically or horizontally, must be of sufficient size in cross section throughout its length to provide a low gas velocity in the separating zone and therefore such vessels have a correspondingly large volume of heated liquid in the lower portion of the vessel.

A further factor causing conventional low temperature separating units to be designed with relatively large separating vessels is the use of separate distillate and water discharge systems from the vessel. Separate discharge lines with separate liquid level controls are customarily used to prevent excessive hydrate formation in the discharge line which would result from cooling of the light hydrocarbons in the distillate when the pressure is decreased and portions of the liquids flash as they are discharged from the high pressure within the separator unit.

In many installations, such as offshore locations, the large size of the conventional low temperature separating unit is in itself a serious defect. Moreover, in any installations, large inefficient vessels are more costly to install and maintain than equivalent smaller more efficient units.

Accordingly, it is a primary object of this invention to provide a low temperature separating unit having improved efficiency in the separation of liquid and solid components from a gas stream and permitting the use of a comparatively smaller vessel than would be required for the same capacity separator constructed in accordance with present conventional designs.

Another object of this invention is to provide a compact low temperature separating unit wherein the gas is caused to flow through a zone of large cross-sectional area for efficient separation of solid and liquid particles from said gas stream.

A further object of this invention is to provide a compact low temperature separating unit wherein a relatively thin layer of distillate is maintained in the lower portion of a substantially spherical separating vessel, above a layer of water, with said upper liquid level being maintained substantially at or below the horizontal center line of the spherical vessel to provide both a relatively large surface area and a relatively large area of liquid interface between the liquid layers.

Another object of this invention is to provide a compact low temperature separating unit in which a relatively thin layer of distillate is maintained above a layer of water and both distillate and water are discharged from the vessel through a single discharge line.

A still further object of our invention is to provide a low temperature separating unit in which the water and distillate are discharged from a single discharge conduit.

A further object of this invention is to provide a low temperature separating unit in which at least a major portion of the retained liquid is maintained in the lower half of a spherical vessel so that a maximum amount of liquid surface area is provided to support hydrates and ice with a relatively small volume of heated liquid retained in the vessel.

In accordance with our invention we provide a low temperature separating unit having a substantially spherical separating vessel in which natural gas may be expanded into a cold zone located in the upper portion thereof. Liquid hydrocarbons, hydrates, water and ice particles which may be removed from the gas stream in the cold zone are precipitated into a compartment in the lower portion of the vessel where we provide liquid retaining means to maintain a relatively thin layer of distillate floating upon a layer of water. The hydrates and ice are of variable density but the densities of such materials are such that they will all be retained above the interface of the two liquid layers and some particles may be light enough to float on the surface of the distillate. The highest liquid level is preferably maintained close to or slightly below the horizontal center line of the spherical vessel. By the use of our invention, efficient heating means may be provided in a lower compartment of said vessel to decompose hydrates and melt ice, by the use of normal flow of liquid across the long dimension of elongated heating means submerged in said liquid. After ice and hydrates which may be precipitated have been melted, the water and distillate are each caused to pass through separate conducting means into a single discharge compartment within the lower portion of the vessel. We provide a single discharge conduit from the discharge compartment of the vessel together with heating means associated therewith to heat the discharged liquids and to prevent the formation of hydrates when these liquids may be cooled below the hydrate formation temperature because of flashing of the volatile hydrocarbon components of the distillate when they are released into lower line pressures or low pressure vessels.

In the drawings:

Fig. 1 is a diagrammatic view of a separator unit, constructed in accordance with the invention and showing the separator vessel in a partially sectional isometric view.

Fig. 2 is a vertical sectional view of the separator vessel, taken on lines 2—2 of Fig. 3.

Fig. 3 is a horizontal sectional view of the separator vessel taken substantially on line L of Fig. 4.

Fig. 4 is a vertical sectional view of the separator vessel, taken on lines 4—4 of Fig. 3.

Referring to the drawings, Fig. 1 shows a separator unit illustrating an embodiment of our invention. The numeral 10 designates the high pressure gas line or pipe which is connected to a high pressure natural gas well and conducts the total fluid stream therefrom. At the typical high temperatures and pressures encountered in the reservoir at the bottom of a well of this type, the entire well fluid is gaseous; however, as this fluid is conducted upwardly to the surface of the earth there is usually a decrease in temperature and pressure resulting in some condensation of liquid hydrocarbons and water. To some extent, this condensation of hydrocarbons is due to the well-known phenomenon of retrograde condensation; that is, condensation as a result of pressure decrease. Also, condensation occurs as a result of lowering of temperature which is a principal factor in the production of water condensation in such lines.

In this embodiment the flow line 10 is connected to the gas conducting element 11 of a suitable liquid-gas heat exchanger 12. Natural gas flowing through the line 10 is thus conducted through the exchanger pipe 11 into conduit 13 which conducts the stream into heating coil 14 disposed in a heated compartment in the lower portion of spherical tank 15. As will be more fully explained hereinafter, the well fluid is relatively hot with respect to the liquid in heat exchanger 12 and the liquid contacting the heating coil 14 so that it tends to heat these liquid bodies. After passing through coil 14 the well stream, comprising natural gas and any condensed liquids in the line, is conducted through line 20 into a suitable heat exchanger conduit 21 arranged for passage in heat exchange relationship with the gas discharged from the unit. The exchanger conduit 21 is shown schematically as the tube member in a shell and tube exchanger 22 although any suitable heat exchanger apparatus might be used for this purpose.

The well fluid leaving heat exchanger 22 will have been cooled somewhat by passing through three successive stages of heat exchange contact in elements 11, 14 and 21 so that there is likely to be resulting condensation of water and distillate which will be carried from the exchanger 22 into the line 23. We have found that it is usually advantageous to provide a suitable high pressure, free liquid knock-out device such as the illustrated unit 25 which is shown connected to receive the well stream conveyed by line 23. The total fluid stream is conducted from line 23 into the upper separating vessel 26 wherein the free liquids are separated from the gas stream. Such liquids settle to the bottom of vessel 26 where they drain by suitable conduits, such as pipes 27 and 28, to a lower accumulating vessel 29. A liquid level is maintained in lower vessel 29 by means of a float mechanism 35 which actuates the dump valve 36, controlling the flow through line 37 into tank 15. The upper vessel 26 of the illustrated free liquid knock-out device 25, discharges the gas into line 40 which conveys the gas into the upper portion of tank 15. A valve, choke or other suitable pressure reducing device, such as valve 41, is shown in said line 40 adjacent the entrance into tank 15; however, if desired, this device may be located in line 40 after passing it through the tank wall into vessel 15 so that the valve would be adjacent to the point of discharge. The purpose of the pressure reducing device 41 is to reduce the pressure of the flow stream sufficiently so that expansion of the gas will cause cooling and condensation of hydrocarbons and water which are in the vapor phase in the high pressure gas stream. In some installations, it may be preferable to omit the liquid knock-out 25; if so, the total well stream may be conducted through this expansion valve 41.

Because of the reduced temperature in the cold zone downstream from the pressure reducing device 41, hydrates and, in some instances, ice particles are caused to form in the upper portion of tank 15 together with condensation of liquid hydrocarbons or distillate and water. The liquid condensate, hydrates and any ice which may be formed are thrown generally across the vessel away from the inlet 42 of conduit 43 which conveys the gas into the vessel from the pressure reducing device 41.

Vessel 15 is divided by the wall or baffle 45 into a three-phase separating compartment 47, 46B with a liquid retaining basin in the lower portion thereof, and a discharge compartment 47. Within the compartment 46 liquids and solids are caused to precipitate from the cold gas stream and preferably, the bulk of such liquids and solids are caused to precipitate upon the liquid surface in the general area, designated 46, extending across the liquid surface from a point beneath the inlet 42 and a point beneath the discharge end of liquid conduit 37 and extending transversely of the line between these points on one side thereof to the vessel wall and on the other side approximately to the baffle 48. The precipitated matter falls upon the surface of the liquid retained in the basin formed in the spherical segment in the lower portion of compartment 46 which basin is within the lower portion of the vessel 15. This retained liquid in compartment 46 is preferably maintained at a level L sufficient to submerge the coils 14 by any suitable means such as the appropriate location of the height of the liquid discharge weir 50. The liquids precipitated from the gas stream, as well as the liquids produced by decomposition of hydrates and melting of ice, will normally comprise hydrocarbon liquids, or distillate, and water. We prefer to maintain two liquid levels composed of these liquids as illustrated in Fig. 4 wherein the letter L designates the distillate liquid level and the letter L' designates the water level which is also the level of the interface between the liquids. It is desirable that the distillate level L be at or below the central horizontal plane of the separator and just above the coils 14. The level L' may be maintained by means such as the lower overflow conduit 51 which is illustrated with an opening 53 disposed an appropriate distance below the height of weir 50 to maintain the lower level of the heavier liquid slightly below the level of the lighter, immiscible, liquid. As will be described more particularly hereinafter, in this preferred embodiment of our invention the conduit 51 has its lower opening 53 disposed so as to convey liquid from beneath the coils 14 into compartment 47.

The materials which precipitate out of the gas stream admitted through conduit 43 fall generally upon the surface of the distillate layer in area A upon the surface of the retained liquid in the lower portion of the separator. There the distillate, ice particles and hydrate crystals spread generally over the surface of the liquid and they will be no lower than the surface of the free water layer in this vessel. The hydrates formed may be of variable density and, accordingly, they may float either upon the surface of the distillate layer or upon the surface of the water layer. In either event, since the distillate layer is relatively thin with respect to the depth of the water layer, the hydrates and ice will be spread over an area which may be generally considered to be substantially the same as a surface area of the water layer within the vessel (see Fig. 3 for relationship of the water level indicated at L' and distillate level indicated at L in relationship to the screen 60). It will be observed that the liquid from the free liquid knockout 25 is admitted through conduit 37 into vessel 15 also within the general area A. This liquid, which contains a large amount of hydrocarbons which are volatile at the pressure within vessel 15 so as to cause flashing and resultant cooling, is directed into contact with the heating coil 14.

In this embodiment, both the liquids precipitated from the gas inlet 42 and the liquids admitted through line 37 are generally conducted from area A across the vessel to screen 60 which passes the liquids into area B which is the liquid surface area above said screen, but prevents hydrates and ice particles from flowing into area B with the distillate which flows through a generally arcuate path from area A to weir 50. Baffle 45 defines discharge compartment 47 wherein the liquid level is maintained above the height of the liquid outlet 61, during operation of the unit, by a suitable control such as mechanism 62.

Liquid in discharge compartment 47 is conveyed through the line 63 (Fig. 1) to the exchanger 12 to pass in heat transfer relation with the incoming well fluid; thereafter it passes by conduit 65 through the dump valve 66, actuated by the level control mechanism 62, maintaining the liquid level in the discharge compartment 47. The distillate and water mixture discharged through the valve 66 is conveyed through conduit 68 to a suitable low pressure flash chamber such as the spherical vessel 70, which is usually maintained at atmospheric or slightly greater than atmospheric pressure so that the distillate downstream from the dump valve tends to "flash" or vaporize rapidly in the conduit 68 and in the low pressure flash chamber 70. If such cooling were permitted to reach hydrate formation temperatures, hydrates would be formed in this conduit and in chamber 70 because both water and hydrocarbons are discharged together in this line. However, by taking off the warm water through outlet 53 in the lower part of compartment 46 after this water has been heated by coils 14 and by heating the water and distillate in heat exchanger 12, the liquids discharged into the low pressure chamber 70 are kept above temperatures at which hydrates form. The low pressure flash chamber 70 separates the hydrocarbon liquids, which are withdrawn through line 71, from the water which is withdrawn through line 72. The hydrocarbon vapors which "flash" in this chamber are withdrawn through line 73. This vessel stabilizes the distillate so that the hydrocarbons discharged through the line 71 are relatively stable at atmospheric temperatures and pressures.

It will be apparent to those skilled in the art that we have provided a new method and means for the low temperature separation of liquids and ice or hydrate particles from gases wherein the surface areas of the liquid levels L and L' are relatively large compared to the associated volume of liquid which is heated by means of coils 14. Since the ice and hydrates float on the water or, in some instances, the distillate, they are retained at or above these levels. Thus, our device is highly efficient in having a low volume of liquid to be heated with respect to the area of liquid surface where the melting of hydrates and ice actually occurs. Also, since the hydrates are melted at the liquid surfaces there is a distinct advantage in maintaining a liquid level in the lower portion of a substantially spherical vessel such as we have described, or a vessel having a substantially spherical segment at the bottom thereof, wherein a small volume of liquid is required to provide a large surface area. Thus, for a given quantity of liquid passing through the lower portion of the vessel, a higher liquid temperature can be achieved with resulting efficiency.

Moreover, further efficiency is possible in our unit because it is adapted to the use of substantially normal flow across the coils 14. In this respect, it will be noted that, in the embodiment illustrated in the drawings, the liquid flowing from zone A to zone B is caused to flow in a generally normal or perpendicular direction to the long passes of the coil 14. Normal flow is not feasible in units using the more conventional cylindrical tank because the number of turns required to run the coils across the cylinder would be prohibitive. By thus providing normal liquid flow across the coils 14 we achieve a higher rate of heat transfer from the coils 14 to the liquid resulting in further overall efficiency and relatively high temperatures in the liquid bath compared with present conventional low temperature separators.

A further feature of our low temperature separating unit is our provision of the baffle 48 extending outwardly from baffle 45 to insure that the gas entering through conduit 43 cannot pass directly across the vessel to the gas outlet 80. These baffles cause the gas to primarily expand above zone A and pass from zone A across the central portion of the vessel where the velocity is relatively low so as to achieve substantially complete precipitation of liquid and solid particles therefrom before the gas passes over the screen 60. Moreover, in the illustrated embodiment, the gas leaving by way of outlet 80 is caused to pass around target baffle 81 which is held in position by legs 81a so that it will entrap any fine crystals of hydrates or ice entrained in the gas stream. The gas passing through the outlet 80 is conveyed to the gas-to-gas heat exchanger 22 by line 82. After passing in heat exchange relationship with the well stream passing through exchanger 22, the gas leaves the unit through line 85.

The spherical separating unit illustrated in the accompanying drawings is shown with a bottom drain 90 passing through the supporting skirt 91. Although shown as a part of the illustration of our invention, it will be apparent that the use or non-use of such a drain for this unit is not pertinent to the practice of the invention.

It will be noted that, as a part of the illustrative example of our invention which we have heretofore described, we have shown the operation of three successive stages of heat exchange between a well stream and the separated phases produced from the expanded gas. Namely, the entering well stream is partially cooled in exchanger 12, in the cooling coils 14 within the separator itself, and in the heat exchanger 22. The expanded gas leaving expansion valve 41 is separated into a gas phase and a liquid phase within separator 15; the gas phase is then conveyed from separator 15 through heat exchanger 22 where it is passed in heat exchange contact with the well stream. The liquid phase (and, prior to decomposition or to melting, the solid phase) produced from the expanded well stream passes in indirect heat exchange relationship with the relatively warm well stream which is conducted through coil 14 and, upon discharge, these liquid components are conducted in indirect heat exchange relationship with the entering well stream in heat exchanger 12. The use of these successive stages of heat exchange contributes to the overall efficiency of the unit so as to provide a very compact low temperature separator unit.

However, it will be apparent that, within the practice of our invention, any of these heat exchangers may be altered in form or another heating or cooling means substituted for one or more exchanger elements. Moreover, we have found that, depending upon the composition of the well fluid and its temperature and pressure, some of the heating and cooling steps may be omitted from a separator unit constructed in accordance with the teachings of our invention. For example, under most operating conditions, we have found that the described embodiment may be modified by omitting the exchanger 12 entirely. The primary purpose of providing this exchanger is to insure that the mixture of water and hydrocarbons which are discharged in line 63 should not be cooled by evaporation and expansion after passing valve 66 below the temperature at which this distillate-water mixture would form hydrates. By this temperature control in the low pressure discharge line we are able to avoid the extra cost and the space which would be required to provide separate discharge lines for the water and distillate. Elimination of the exchanger 12 is made possible by utilizing the efficient heating means we have provided within the vessel 15. We have heretofore mentioned as a factor in this regard the efficient heat exchange obtained by normal flow across the coils 14. In addition, by the location of the coil 14 in conjunction with the screen 60 so that the distillate is forced to pass in close contact with several turns of the coil before passing into the discharge chamber 47, we obtain efficient heating of the distillate before it is passed into the discharge chamber 47. Moreover, effective heating of the liquids within the vessel is promoted by causing the water which is released within compartment 46 to pass downwardly (Fig. 2) in contact with the hot coils 14 before passing through the outlet 53 into the discharge chamber 47. The commingling of this warm water from conduit 51 with the distillate further heats the latter so that the total stream passing into discharge line 63 is generally at a temperature which will permit the stream to be released to atmospheric pressure without the formation of ice or hydrates.

It will further be understood that certain features and subcombinations of our invention are of utility and may be employed without reference to other features and subcombinations. This is contemplated by and within the scope of the claims.

Since many possible embodiments may be made of this invention without departing from the scope thereof, it is to be understood that all matter herein set forth or shown in the accompanying drawings is to be interpreted as illustrative only and not in a limiting sense; we therefore contemplate by the appended claims to cover any such changes and modifications as fall within the true spirit and scope of our invention.

What we claim as new and desire to secure by Letters Patent is:

1. A separating apparatus comprising an inlet conduit connected to a gas well for conducting therefrom a high pressure natural gas well stream; an external heat exchanger having first and second heat exchange passages therethrough; said inlet conduit being connected to the first heat exchange passage of said external heat exchanger to convey the well stream into said first heat exchange passage; a substantially spherical separator vessel having a cold zone in an upper portion thereof and a warm zone in a lower portion thereof; means for maintaining a liquid level in the lower portion of said vessel at a height not substantially above the horizontal central plane of said separator; a heat exchange member disposed in the lower portion of the separator vessel means for conducting the well stream from the first heat exchange passage after its temperature has been reduced therein to said heat exchange member to heat the liquid maintained in the lower portion of the separator and to further reduce the temperature of said well stream; a fluid inlet in the upper portion of said vessel between the warm zone and the top of the vessel; a conduit between the heat exchange member and said fluid inlet in the upper portion of said separator for conducting the well stream to said upper portion of the separator vessel; pressure reducing means associated with said conduit for expanding the well stream into the separator vessel to reduce the temperature thereof to a point where hydrocarbon distillate and water are condensed from said well stream whereupon hydrates and ice may be formed; said cold zone being adapted to cause said condensed liquid, hydrates and ice to precipitate into said warm zone; a gas outlet extending from said separator vessel at a level above the liquid level; said gas outlet being spaced from the fluid inlet with the vertical center of said spherical vessel substantially between said inlet and outlet; means forming a discharge compartment within said separator vessel; means for maintaining a stratum of water and a stratum of distillate floating upon said water in the lower portion of said separator, said means comprising overflow means for conveying distillate from said distillate stratum into said discharge compartment and a water removal conduit adapted to conduct liquid from a lower portion of the warm zone into said discharge compartment with the discharge opening of said water removal conduit being disposed beneath the distillate overflow a sufficient distance to maintain a predetermined depth of the distillate above the water stratum within the warm zone; restraining means associated with said distillate overflow means to prevent passage of hydrates and ice particles into said discharge compartment; means for maintaining a liquid level in the lower portion of said discharge compartment below the discharge opening of the water removal conduit; means for conveying the water and distillate removed from said discharge compartment into said second heat exchange passage of said external heat exchanger to pass said distillate and water in heat exchange relation with the well stream; a discharge valve operatively connected with the means for maintaining the liquid level in said discharge compartment to discharge said liquid into lower pressure; conduit means connecting said discharge valve with said second heat exchange passage to convey the water and distillate to said valve after the temperature of these liquids has been raised in said second heat exchange passage; means forming a low pressure flash chamber to separate water and distillate and remove volatile hydrocarbons; a low pressure conduit between said dump valve and said flash chamber to convey said water and distillate into said flash chamber; a water outlet extending from said flash chamber; a distillate outlet extending from said flash chamber; and a gas outlet extending from said flash chamber.

2. An enclosed separating apparatus comprising an inlet conduit for conducting a fluid stream containing hydrocarbons and water in the liquid and vaporous status; a first heat exchanging means connected to the inlet conduit to reduce the temperature of the fluid stream; a substantially spherical separator vessel having a cold zone in an upper portion thereof and a warm zone in a lower portion thereof; means for maintaining a liquid level in said vessel at a height not substantially above the horizontal central plane of said separator; a well fluid conduit having a portion thereof disposed in the lower portion of the separator vessel; means for conducting the well stream from the first heat exchanging means to said well fluid conduit to supply heat to the liquid maintained in the lower portion of the separator vessel; a second heat exchanging means to reduce the temperature of the gas stream from said well fluid conduit; a conduit between the well fluid conduit and said second heat exchanging means for conducting the gas stream from the well fluid conduit to said second heat exchanging means; a high pressure liquid knockout unit adapted to remove free liquid from a gas stream; a conduit arranged for conducting the well stream from said second heat exchanging means into said liquid knockout unit; a liquid conductor between the liquid knockout unit and the separator vessel for conducting the free liquid removed from the gas stream in the liquid knockout unit into the separator vessel; a gas conductor between the liquid knockout unit and the cold zone of the separator vessel for conducting gas from said liquid knockout into the cold zone of the separator vessel; means in the gas conductor for expanding the gas stream into the cold zone to reduce the temperature of the gas stream to a point sufficient to cause hydrocarbon distillate and water to condense from said gas stream whereupon hydrates and ice may be formed; said cold zone being adapted to cause said condensed liquid, hydrates and ice to precipitate downwardly into said warm zone; a gas outlet from said vessel; a conduit from said gas outlet to said second heat exchanging means to pass the gas from said vessel in heat exchange relation with the well stream prior to conducting said well stream into the liquid knockout unit; means forming a discharge chamber within said separator vessel; overflow means for conveying distillate from said distillate stratum into said discharge chamber; restraining means associated with said distillate overflow means to prevent passage of hydrates and ice particles into said discharge chamber; a water removal conduit arranged to conduct liquid from a lower portion of the warm zone into said discharge chamber with the discharge opening of said water removal conduit being disposed beneath the distillate overflow means a predetermined distance to maintain a relatively thin distillate stratum above said water stratum within the warm zone; means for maintaining a liquid level in the lower portion of said discharge chamber below the discharge opening of the water removal conduit; means for conveying the water and distillate from said discharge chamber into the first heat exchanging means to pass said distillate and water therethrough in heat exchange relation with the inlet fluid stream; a liquid dump valve operatively connected with the means for maintaining the liquid level in said discharge chamber; and conduit means connecting said liquid dump valve with said first heat exchanging means to convey said distillate and water from said first heat exchanging means to said dump valve; means forming a low pressure flash chamber; conducting means to convey said distillate and water from said dump valve to said low pressure flash chamber; means for removing water from said flash chamber; means for removing gas from said flash chamber and means for removing distillate from said flash chamber.

3. A separating apparatus comprising an inlet conduit for conducting a fluid stream containing liquid and vaporous hydrocarbons and water; a substantially spherical separator vessel having a cold zone in an upper portion thereof and a warm zone in a lower portion thereof; means for maintaining a liquid level in the lower portion of said vessel; a heat exchange coil disposed in the lower portion of the separator vessel and connected to said inlet conduit to conduct the well stream through said heat exchange coil to supply heat to the liquid maintained in the lower portion of the separator; an external heat exchanging means; a gas conductor between the heat exchange coil and said heat exchanging means for conducting the gas stream from the heat exchange coil to said heat exchanging means; a high pressure liquid knockout adapted to remove free liquid from a gas stream; a conduit connected to conduct the well stream from said heat exchanging means into said liquid knockout unit; a liquid conductor between the liquid knockout unit and the separator vessel for conducting the free liquid removed from the gas stream in the liquid knockout unit into the separator vessel; a gas conduit between the liquid knockout unit and the cold zone of the separator vessel for conducting the gas stream from said liquid knockout unit into the cold zone of the separator vessel; means in the gas conductor for expanding the gas stream into the cold zone to reduce the temperature of the gas stream to a point sufficient to cause hydrocarbon distillate and water to condense from said gas stream and the liquid water to form hydrates and ice particles; said cold zone being adapted and arranged to precipitate said condensed liquid and hydrates and ice downwardly into said warm zone; a gas outlet from said vessel; a conduit from said gas outlet to the external heat exchanging means; said conduit being connected to pass the gas discharged from said vessel through said heat exchanging means in heat exchange relation with the well stream prior to conducting said stream into the liquid knockout unit; means forming a discharge chamber within said separator vessel; means for maintaining a stratum of water and a predetermined relatively thin stratum of distillate floating upon said water in the lower portion of said separator, said means comprising an overflow means for conveying distillate from said distillate stratum into said discharge chamber and a water removal conduit arranged to conduct liquid from a lower portion of the warm zone below the heat exchange coil into said discharge chamber with the discharge opening of said water removal conduit being disposed beneath the overflow means substantially the same distance as the depth of the distillate stratum maintained above said water stratum within the warm zone; restraining means associated with said distillate overflow means to prevent passage of hydrates and ice particles into said discharge chamber; a liquid discharge conduit for conveying the water and distillate from said discharge chamber; a liquid dump valve connected to the liquid discharge conduit to release the discharged liquids to a relatively lower pressure; a low pressure fluid conduit connected to convey fluids from said dump valve.

4. A separating apparatus comprising an inlet flow conduit for conducting the stream from a high pressure natural gas well; a substantially spherical separator vessel having a cold zone in an upper portion thereof and a warm zone in a lower portion thereof; means for maintaining a liquid level in the lower portion of said vessel; a heat exchange member connected to receive the flow from said inlet flow conduit and disposed in the lower portion of the separator vessel to utilize the heat from the well stream to supply heat to the liquid maintained in the lower portion of the separator; a fluid inlet in the upper portion of said vessel between the warm zone and the top of the vessel; means for conducting the well stream to said fluid inlet from said heat exchange member; pressure reducing means in the gas conductor for expanding the gas stream into the separator vessel to reduce the temperature of the gas stream to a point sufficient to cause hydrocarbon distillate and water to condense from said gas stream whereupon hydrates and ice may be formed; said cold zone being adapted to direct said condensed liquid and hydrates and ice into said warm zone; a gas outlet extending from said separator vessel above the liquid level therein and spaced from said fluid inlet, a baffle member disposed within the cold zone between said gas outlet and said fluid inlet to cause the gas passing to said outlet to follow an arcuate path through said cold zone, means for maintaining a stratum of water and a relatively thin stratum of distillate floating upon said water in the lower portion of said separator; a combined water and distillate removal conduit extending from said separator vessel; a liquid dump valve connected to discharge said distillate and water to a relatively lower pressure; conduit means connecting said liquid dump valve with the combined water and distillate removal conduit; means forming a low pressure flash chamber adapted to stabilize said distillate for atmospheric storage; a low pressure conduit arranged to conduct the liquids from said liquid dump valve to said flash chamber; means for removing water from said flash chamber; means for removing gas from said flash chamber and means for removing distillate from said flash chamber.

5. An enclosed separating apparatus comprising an inlet conduit for conducting a high pressure natural gas well stream; an external cooling means connected to said inlet conduit; a separator vessel having a cold zone in its upper portion and a warm zone in a lower portion of said vessel; means forming a liquid retaining basin in the warm zone in said lower portion of said vessel, said basin having an internal surface of substantially spherical segmental form; means for maintaining a liquid body disposed in the lower portion of said vessel and with substantially all of said liquid body within said liquid retaining basin; a heat exchange member disposed in the warm zone of the separator vessel; means for conducting the well stream from the external cooling means into said heat exchange member to supply heat from said well stream to the liquid maintained in the lower portion of the separator; a fluid inlet disposed in the upper portion of said vessel between the warm zone and the top of the vessel; a gas conductor between the heat exchange member and said fluid inlet for conducting the gas stream from said heat exchange member to said fluid inlet; pressure reducing means in the gas conductor for expanding the gas stream into the separator vessel to reduce the temperature of the gas stream to a point sufficient to cause hydrocarbon distillate and water to condense from said gas stream and to cause the condensed water to form hydrates and ice; said cold zone being adapted to cause said condensed liquid, hydrates and ice to precipitate downwardly into said warm zone; a gas outlet extending from said separator vessel above the liquid level therein and spaced from said fluid inlet; a baffle member disposed between said gas outlet and said fluid inlet; means for maintaining a stratum of water and a relatively thin stratum of distillate floating upon said water in the lower portion of said separator; a combined water removal and distillate removal conduit extending from said separator vessel; an external heating means connected to said removal conduit to heat the discharged liquid; a liquid dump valve; conduit means connecting said liquid dump valve with said external heating means; means forming a low pressure flash chamber to separate distillate and water and remove volatile hydrocarbons; conducting means between said dump valve and said low pressure flash chamber; means for removing water from said flash chamber; means for removing gas from said gas chamber and means for removing distillate from said flash chamber.

6. A low temperature separating unit comprising: a separating vessel; a barrier member within said vessel; a separating compartment and a discharge compartment within said vessel defined by said barrier member; said separating compartment having in the upper portion thereof a cold zone adapted and arranged to precipitate from the gas stream liquid hydrocarbons, hydrates, water, ice particles and the like and in the lower portion thereof a warm zone within a portion of said vessel conforming substantially to a spherical segment, said warm zone being arranged to receive material precipitated from the gas stream in the cold zone; a natural gas well stream inlet with temperature reducing gas expanding means associated therewith; said inlet discharging into the cold zone of said separating compartment; means for maintaining two liquid levels defining a lower layer of water at a predetermined level within said warm zone and within the portion of said vessel conforming to a spherical segment and a relatively thin layer of distillate floating upon said layer of water, said means for maintaining two liquid levels comprising a distillate overflow means adapted and arranged to maintain a distillate liquid level in the warm zone of said separating compartment and to convey distillate overflow from said distillate layer in said warm zone into said discharge compartment, and a water conduit disposed to convey liquid from said warm zone of said separating compartment from a level below the distillate overflow means, said conduit being arranged to permit water to overflow from said separating compartment at substantially the predetermined water level maintained within the warm zone therein; said distillate overflow means being disposed in spaced relation to the fluid inlet to cause the precipitated distillate to flow over a relatively long arcuate path from beneath the well stream inlet to said overflow means; a discharge conduit from said discharge compartment; a discharge control means for maintaining a predetermined liquid level in said discharge compartment below the discharge level of said water conduit; a discharge heating means adapted and arranged to heat the liquid within said liquid discharge conduit; a liquid discharge valve within said discharge conduit operatively connected to said discharge control means to control the discharge of said liquid through said discharge conduit; tubular heating means disposed in the warm zone of said separating compartment to decompose hydrates and melt ice particles; a portion of said tubular heating means being disposed above the water level within said warm zone of said compartment and below the surface level of the distillate maintained above said water level; said tubular heating means being so arranged that a relatively large portion thereof is disposed transverse to the direction of flow of the major portion of precipitated distillate passing toward said distillate overflow means.

7. In a low temperature separating unit of the type having a separating vessel; a natural gas well stream inlet extending into said vessel with temperature reducing gas expanding means associated therewith, the upper portion of said vessel having therein a relatively cold separating zone downstream of said expanding means which is adapted to remove from the gas stream liquid hydrocarbons, hydrates, water and ice particles; the improvement comprising: a lower portion of said vessel conforming in shape substantially to that of a spherical segment; a heated liquid retaining basin within said spherical segment; said heated liquid retaining basin being arranged to receive liquids and solids precipitated from the separating zone of the upper portion of the vessel; means for maintaining a liquid body disposed within said heated liquid retaining basin within said spherical segment of said vessel; means forming a discharge compartment within the lower portion of said vessel adjacent said heated retaining basin; means for maintaining a relatively thin stratum of distillate floating upon a stratum of water in said liquid body within the heated retaining basin; said means comprising a distillate overflow means adapted and arranged to maintain a distillate liquid level in the heated retaining basin and to convey distillate overflow from said distillate layer in said heated retaining basin into said discharge compartment and a water conduit disposed to convey liquid from said heated retaining basin from a level below said distillate overflow into said discharge compartment, said water conduit being arranged to permit water to overflow from said heated retaining basin at a predetermined water level below the distillate overflow; a liquid discharge conduit from said discharge compartment, a heating means connected to said liquid discharge conduit to heat said liquid discharge; a liquid discharge valve to convey the discharged liquid from the heating means into a low pressure conduit; conduit means disposed between said heating means and said discharge valve; and an elongate heating means in the warm zone of separating vessel, said heating means having a substantial portion thereof disposed above the water level within said warm zone but below the surface level of the distillate maintained in said warm zone.

References Cited in the file of this patent

UNITED STATES PATENTS

| | | |
|---|---|---|
| 2,528,028 | Barry | Oct. 31, 1950 |
| 2,690,814 | Reid | Oct. 5, 1954 |
| 2,738,026 | Glasgow et al. | Mar. 13, 1956 |
| 2,747,002 | Walker et al. | May 22, 1956 |
| 2,756,837 | Lovelady et al. | July 31, 1956 |
| 2,758,665 | Francis | Aug. 14, 1956 |
| 2,825,423 | Scheirman et al. | Mar. 4, 1958 |
| 2,869,675 | Coggins | Jan. 20, 1959 |